Figure 3:
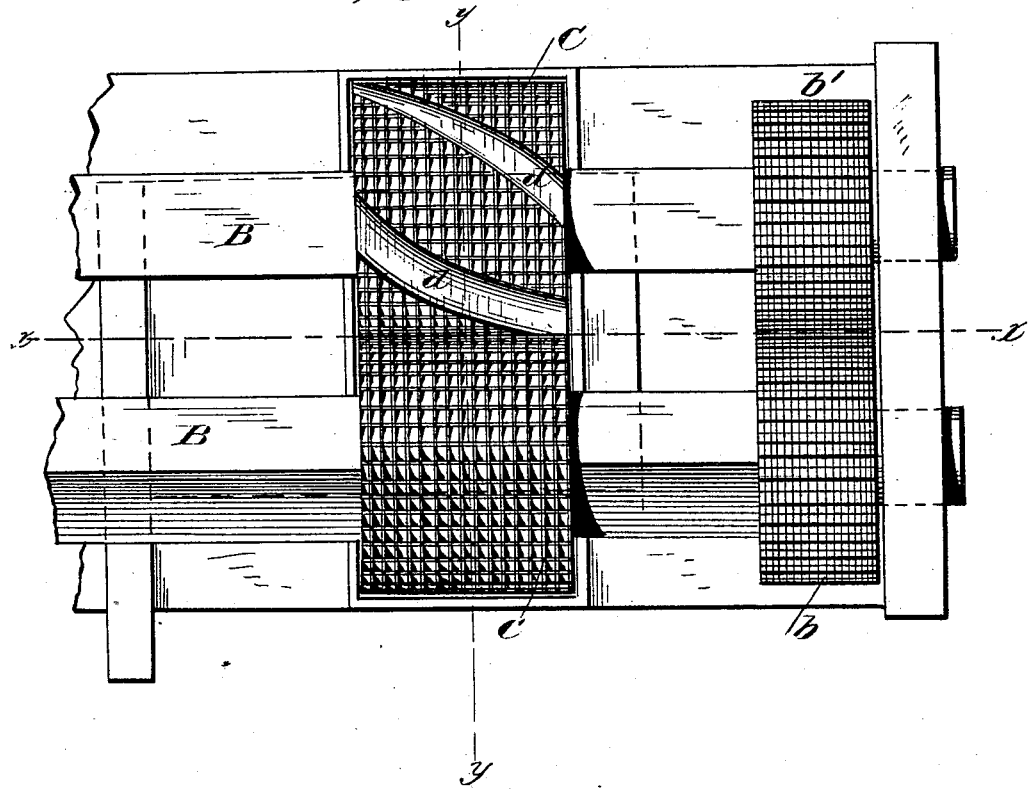

(Model.)
H. RIEDEL.
FEED ROLL FOR SEEDING MACHINES.
No. 250,976. Patented Dec. 13, 1881.
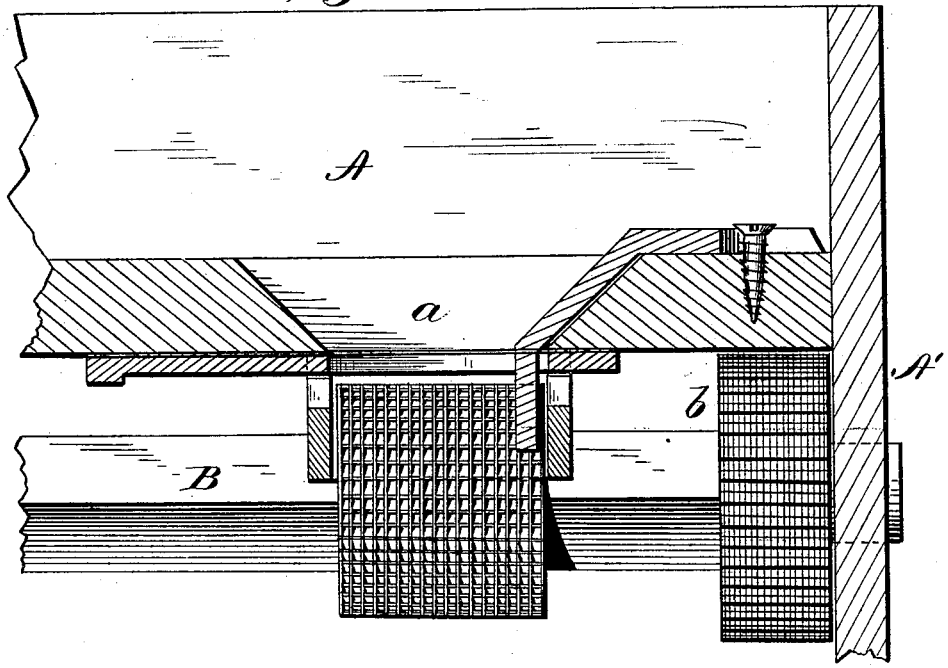
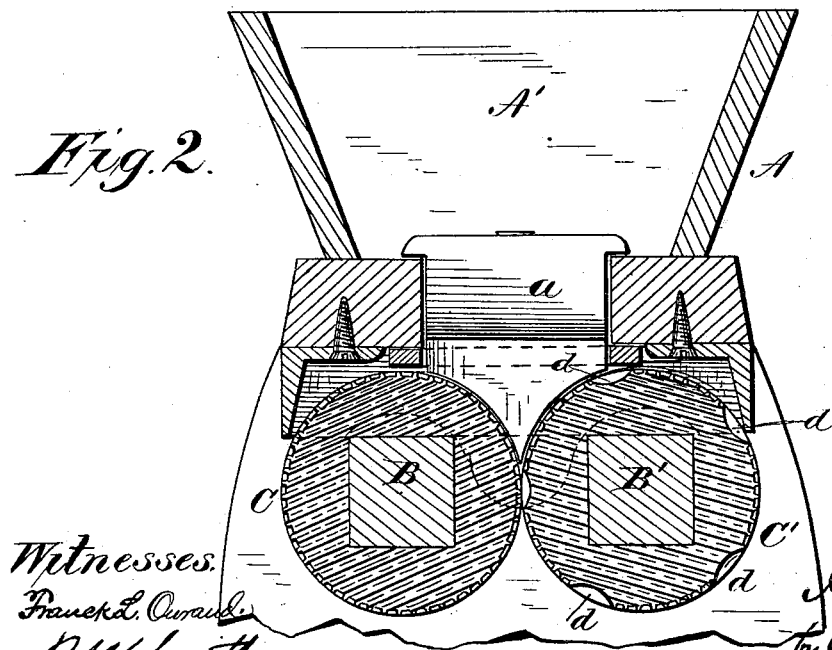

(Model.)

H. RIEDEL.
FEED ROLL FOR SEEDING MACHINES.

No. 250,976. Patented Dec. 13, 1881.

Witnesses.
Franck L. Ouraud
R. M. Smith

Inventor.
Heinrich Riedel,
by A. M. Smith,
Attorney

UNITED STATES PATENT OFFICE.

HEINRICH RIEDEL, OF GREENCASTLE, PENNSYLVANIA, ASSIGNOR TO J. B. CROWELL & CO., OF SAME PLACE.

FEED-ROLL FOR SEEDING-MACHINES.

SPECIFICATION forming part of Letters Patent No. 250,976, dated December 13, 1881.

Application filed October 5, 1881. (Model.)

*To all whom it may concern:*

Be it known that I, HEINRICH RIEDEL, of Greencastle, county of Franklin, State of Pennsylvania, have invented new and useful Improvements in Feed-Rolls for Seeding-Machines, of which the following is a full, clear, and exact description, reference being had to the accompanying drawings, making part of this specification, in which—

Figure 1 represents a vertical transverse section through a portion of the grain box or hopper, taken on the line $x\,x$, Fig. 3, and showing one of the elastic feed-rolls in elevation. Fig. 2 is also a vertical section, taken at right angles to Fig. 1 on the line $y\,y$, Fig. 3; and Fig. 3 is a bottom view of the hopper, showing the construction of the elastic feed-rolls.

My invention relates to that class of seeding-machines employing elastic feed-rolls arranged in pairs underneath discharge-outlets in the bottom of the grain box or hopper, and between which rolls the grain or seed is fed outward to the distributing device or hoes, and has for its object the adaptation of such feed-rolls to larger seed or grain than can be evenly and successfully operated upon by elastic feed-rolls as heretofore constructed.

The invention consists in providing the feed-rolls, (one or both of each pair,) in addition to the usual roughened or corrugated surface, with transverse spiral grooves adapted to act not as feed-channels, but for giving the elastic roll an increased "bite" or capacity to take hold of and carry through the seed, thereby adapting them to larger seed than is usually operated upon by this class of machines.

It further consists in a novel arrangement of these spiral grooves whereby they are made to lap one by another on the periphery of the roll, and thereby to make the increased bite continuous, especially adapting the rolls to sow or plant large seed—such as corn, &c.—evenly in drills, as hereinafter explained.

The machine in its general construction and arrangement of parts may be similar to any now in use employing elastic feed-rolls, and need not therefore be described in detail.

A represents the seed box or hopper, and $a$ openings in the bottom thereof through which the grain passes to the feed-rolls.

B B' are two parallel transverse shafts, mounted in suitable bearings in the end standards, supporting the grain-box A', or forming part thereof. These shafts may be geared together, as shown at $b\,b'$, so as to cause them to move in opposite directions at the same rate of speed, and one may be geared to, or, if desired, may form the main drive-wheel axle, the arrangements being such as to cause them on their upper faces to move inward toward each other. Upon these shafts are secured the elastic feed-rolls C and C', arranged in pairs, ordinarily one pair for each hoe or drill-tooth with which the machine is provided, and secured thereto, so as to rotate with said shafts with their outer faces in frictional contact, as shown. These elastic rolls, in addition to the usual roughened or corrugated faces employed for adapting them to grasp and pass through between them the grain resting in contact with their inner adjacent faces, are provided, one or both of each pair, with spiral grooves $d\,d$, extending across them from side to side, and, by preference, so arranged that the forward or advance end of one groove overlaps on the periphery of the roll the rear end of the preceding groove. By this construction of the rolls they are given an increased capacity for grasping the grain, and are thereby adapted to operate upon larger grain than by the ordinary construction, and by causing the grooves to overlap one another, as explained, this increased capacity or bite of the roll is made practically continuous, particularly adapting the rolls to the seeding of large grain—such as corn—in drills. The spiral grooves are not in any sense designed to act as feed-channels for the passage of the grain, but are simply for the purpose of giving an increased bite to the elastic surfaces, and to so arrange this increased bite as to make it continuous. Ordinarily these spiral grooves will be required upon one roll only of each pair, but under some conditions, or with some particular kinds of seed, it may be found advantageous to apply them to both rolls.

Having now described my invention, I claim—

1. In a seeding-machine, an elastic feed-roll provided on its periphery with spiral transverse grooves for giving it increased bite, substantially as described.

2. In a seeding-machine employing elastic feed-rolls arranged in pairs and provided with spiral grooves for giving them increased bite, as explained, the arrangement of said grooves to overlap one another on the periphery of the roll for making the increased bite continuous, substantially as described.

In testimony whereof I have hereunto set my hand this 4th day of October, A. D. 1881.

HEINRICH RIEDEL.

Witnesses:
JOHN G. WALLECH,
LUIS CANTINO.